US009169085B2

(12) United States Patent
Schill et al.

(10) Patent No.: US 9,169,085 B2
(45) Date of Patent: Oct. 27, 2015

(54) COMPLIANT VACUUM TRANSFER STARWHEEL

(71) Applicant: Belvac Production Machinery, Inc., Lynchburg, VA (US)

(72) Inventors: Joseph G. Schill, Lynchburg, VA (US); Harold J. Marshall, Forest, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 106 days.

(21) Appl. No.: 13/706,636

(22) Filed: Dec. 6, 2012

(65) Prior Publication Data

US 2014/0158501 A1 Jun. 12, 2014

(51) Int. Cl.
*B65G 47/26* (2006.01)
*B65G 47/84* (2006.01)

(52) U.S. Cl.
CPC .................................... *B65G 47/848* (2013.01)

(58) Field of Classification Search
USPC .......... 198/803.5, 470.1, 471.1, 473.1, 478.1, 198/441, 450, 459.2; 72/94
See application file for complete search history.

(56) References Cited

U.S. PATENT DOCUMENTS

| | | | | |
|---|---|---|---|---|
| 4,124,112 A | * | 11/1978 | Mohney et al. | ............... 198/394 |
| 4,458,277 A | * | 7/1984 | Ragle et al. | ............... 360/98.03 |
| 4,921,093 A | * | 5/1990 | Peters et al. | ............... 198/471.1 |
| 5,373,934 A | | 12/1994 | Jackson | |
| 5,957,655 A | | 9/1999 | Gomez | |
| 8,006,826 B2 | | 8/2011 | Licht | |
| 8,245,551 B2 | | 8/2012 | Egerton | |
| 8,708,134 B2 | * | 4/2014 | Briggs et al. | ............... 198/478.1 |
| 2012/0292159 A1 | * | 11/2012 | Egerton | ............... 198/617 |

FOREIGN PATENT DOCUMENTS

WO WO2007/031239 3/2007

OTHER PUBLICATIONS

International Search Report for International Application No. PCT/US2013/073406, dated Mar. 20, 2014, 4 pages.
Written Opinion for International Application No. PCT/US2013/073406, dated Mar. 20, 2014, 7 pages.

* cited by examiner

*Primary Examiner* — Gene Crawford
*Assistant Examiner* — Lester Rushin
(74) *Attorney, Agent, or Firm* — Nixon Peabody LLP

(57) ABSTRACT

A transfer assembly includes a transfer starwheel having recesses to receive an article. Each recess includes a vacuum port and at least one insert formed from a compliant material. The at least one insert at least partially defines a shape of the recess, which corresponds to an aspect of the article. The transfer assembly includes a mounting hub including a plurality of circumferential sets of vacuum openings extending axially along the mounting hub and coupled to a vacuum source. A vacuum is delivered to the vacuum openings. The transfer starwheel is mounted on a mounting hub to align the vacuum ports of the transfer starwheel with a selected set of vacuum openings on the mounting hub. The mounting hub rotates so that the transfer starwheel receives the article into one of the recesses at a first position and rotates to a second position while holding the article with the vacuum.

20 Claims, 4 Drawing Sheets

COMPLIANT VACUUM TRANSFER STARWHEEL

FIELD OF THE INVENTION

The present invention relates generally to manufacturing machinery and, more particularly, to systems and methods for transferring articles, such as cans, bottles, and other containers, between manufacturing machines.

BACKGROUND OF THE INVENTION

In the can making industry, different approaches exist for transferring cans between processing turrets in continuous motion machinery. One approach employs a vacuum transfer starwheel, an example of which is described in U.S. Pat. No. 7,418,852, titled "Quick Change over Apparatus for Machine Line" and issued on Sep. 2, 2008, the contents of which are incorporated entirely herein by reference.

The vacuum transfer starwheel receives a can from a first processing turret into a recess and rotates to move the can to a position where it can be transferred to another processing turret. Vacuum is used to secure the can in the recess against gravity and/or centrifugal force as the starwheel rotates. The recess is typically designed with a diametric clearance that makes it easier for the can to enter and exit the recess as it is transferred between processing turrets.

Conventional transfer starwheels can generally handle a range of can lengths as long as the center of gravity of the can remains inside the recess. Depending on the rotational speed of the transfer, the weight of the can, and the vacuum supply, the center of gravity may also reside outside the conventional location provided that the article remains under control during rotation. Thus, when one wants to use a particular can processing machine to handle a can with a different length, the transfer starwheel may need to be repositioned in the machine or may need to be completely replaced with another transfer starwheel to ensure that the center of gravity of the new can remains in the recess or under control. As described in U.S. Pat. No. 7,418,852, a can processing machine may be reconfigured with the addition/replacement of a starwheel segment on quick-change machinery.

When transferring a can between processing turrets, the position where the can is received into the recess (pick-up position) and the position where the can is released (drop-off position) are important, especially as the speed of the machine increases. At high speeds, however, the can may have a tendency to migrate axially in position due to windage, external forces, a slick interface between the can and the starwheel, etc. A transfer starwheel can minimize such migration by applying a sufficient vacuum to the can.

To minimize vacuum leakage between the can and the transfer starwheel and to apply a sufficient vacuum to the can, the can must be properly seated in the recess of the transfer starwheel. In other words, the transfer starwheel must receive the can into the recess with reasonable accuracy to apply the vacuum and maintain control across the full speed range of the machine. An accurate fit between the can and the recess is more easily achieved when the can is substantially cylindrical. Substantially cylindrical cans, for example, include cans where the outside diameter of the sidewall of a middle section is substantially uniform except for the uppermost section and lowermost section of the can. The substantially cylindrical shape of the starwheel recess and the internal vacuum cavity geometry accommodate the substantially cylindrical can for effective transfer between processing turrets. In general, conventional starwheel designs are better suited to handle substantially cylindrical cans.

On the other hand, conventional transfer starwheels may be less effective when handling "shaped" cans. A "shaped can" or "shaped container," as used herein, refers to a can or container whose sidewall at its middle section does not have a substantially uniform diameter (non-cylindrical). When the non-uniform sidewall of the shaped can is received into the starwheel recess, it is more difficult to position the shaped can accurately within the recess and to minimize vacuum leakage. To address this problem, the starwheel recess may be machined to match the can profile more exactly. Such a solution, however, is far from cost effective. In particular, if any aspect of the can geometry is changed, a replacement starwheel must be machined to accommodate the new geometry. Moreover, even if a profiled recess is employed, seating problems may still occur if the can migrates axially in position or if the shape becomes non-asymmetric due to process variabilities. Such seating problems may require the application of a greater vacuum which undesirably increases operating costs. In addition, the profiled recess does not completely address the inherent instability of the shaped can over the full range of machine speeds.

In general, the process of making a can must provide a degree of latitude in product form, as cans vary in material structure, grain direction and material flow. Furthermore, the process of making a can must be sufficiently flexible to accommodate changes in shape for branding or other purposes without incurring unacceptable costs and requiring significant time and effort.

SUMMARY OF THE INVENTION

Systems and methods according to aspects of the present invention employ a transfer assembly that is highly configurable and handles shaped containers more effectively. For example, a transfer assembly includes a transfer starwheel assembly including one or more recesses. Each recess is configured to receive an article, and each recess includes a vacuum port and at least one insert formed from a compliant material. The at least one insert at least partially defines a shape of the recess. The shape of the recess corresponding to an aspect of the article. The transfer assembly also includes a mounting hub assembly including a plurality of circumferential sets of vacuum openings extending axially along the mounting hub assembly and coupled to a vacuum source. A vacuum is delivered to the vacuum openings. The transfer starwheel assembly is configured to be mounted on the mounting hub assembly. The transfer starwheel assembly is positioned on the mounting hub assembly to align the vacuum ports of the transfer starwheel assembly with a selected one of the sets of vacuum openings on the mounting hub assembly. The mounting hub assembly and the transfer starwheel assembly rotate so that the transfer starwheel assembly receives the article into one of the recesses at a first position and rotates with the mounting hub assembly to a second position. The article is held in the recess between the first position and the second position by the shape of the recess and the vacuum at the vacuum port in the recess.

In some embodiments, the transfer starwheel assembly includes a starwheel body and at least one retainer plate. The starwheel body includes the vacuum ports for the recesses. The at least one inserts for the one or more recesses are coupled to the starwheel body with the at least one retainer plate. The at least one inserts are disposed between the starwheel body and the retainer plate. In some cases, for each recess, the at least one insert includes a first insert disposed on a first side of the starwheel body and a second insert disposed on a second side of the starwheel body. The first insert and the second insert extend from the vacuum port, the port applying the vacuum to the article when the article is received in the recess and directly engaged by the first insert and the second insert. In additional cases, guide pins position the at least one insert relative to the starwheel body.

In other embodiments, the mounting hub assembly includes a vacuum assembly that delivers vacuum from the vacuum source to the selected set of vacuum openings and the vacuum ports of the transfer starwheel assembly. The vacuum assembly includes a plurality of passageways for delivering the vacuum and a selector tube disposed in each passageway to direct the vacuum to the selected set of vacuum openings and to close other sets of vacuum openings.

In yet other embodiments, the mounting hub assembly includes alignment slots and the transfer starwheel assembly includes pins that are received by the alignment slots to align the vacuum ports of the transfer starwheel assembly with the selected set of vacuum openings on the mounting hub assembly.

In additional embodiments, at least one other transfer starwheel assembly is mounted on the mounting hub assembly. The at least one other transfer starwheel is aligned with other selected sets of vacuum openings on the mounting hub assembly.

In further embodiments, the at least one insert for each recess is shaped and/or sized, and positioned to fit a contoured profile of the article received into the recess. In yet further embodiments, the at least one insert is formed from rubber or polyurethane.

In yet additional embodiments, the at least one inserts are selected from the plurality of inserts and included in the transfer starwheel assembly.

In other embodiments, at least one of the transfer starwheel assembly and the other transfer starwheel assembly is configured to be mounted in two orientations.

Additional aspects of the invention will be apparent to those of ordinary skill in the art in view of the detailed description of various embodiments, which is made with reference to the drawings, a brief description of which is provided below.

Figure 1:
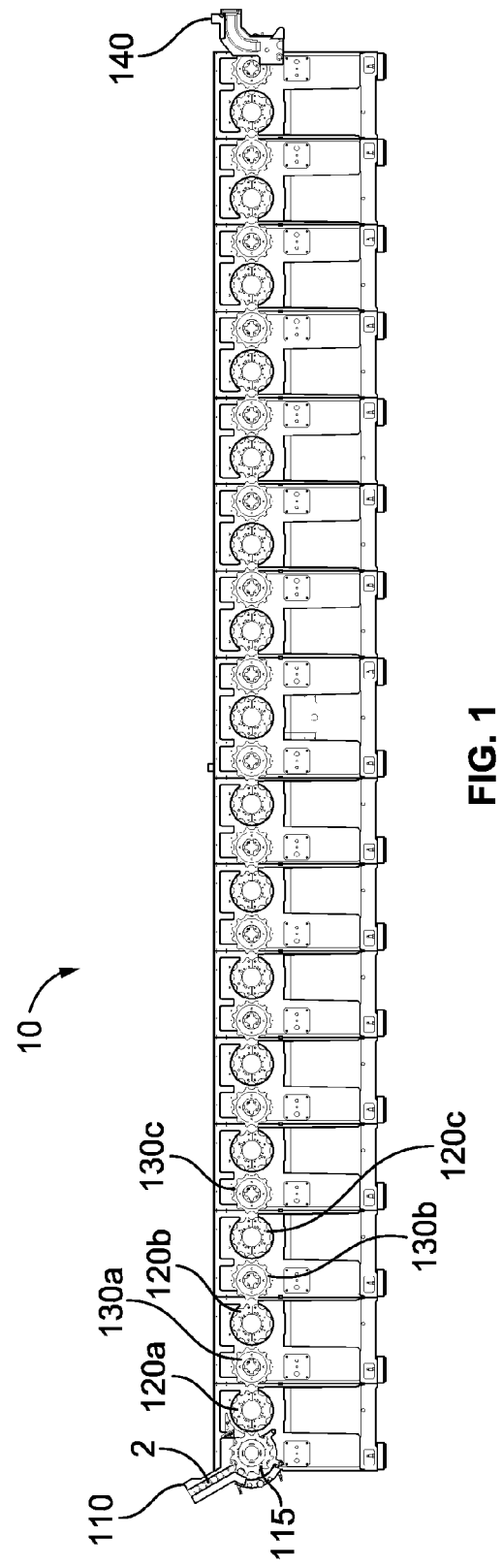
FIG. 1 illustrates an example machine line that processes containers as they pass through a series of processing turrets in a serpentine path, according to aspects of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Systems and methods according to aspects of the present invention employ a transfer starwheel design that handles shaped containers more effectively. In particular, the transfer starwheel includes compliant inserts to define recesses that receive containers. The inserts are formed from materials that provide sufficient compliancy to accommodate varying container shapes within process limits. The starwheel recesses with the inserts provide axial stability through material friction as well as vacuum force. In turn, the axial stability ensures that the container is properly and consistently positioned for transfer between two processing turrets.

Systems and methods according to aspects of the present invention also employ a transfer starwheel mounted on a mounting hub, where the mounting hub includes more than one set of vacuum openings to accommodate more than one axial position for the transfer starwheel along the mounting hub. The mounting hub allows the transfer starwheel to be repositioned on the mounting hub to accommodate different container lengths, without suffering any loss of vacuum supply received through the mounting hub. In addition, the mounting hub has a quick change-over time to allow different container lengths to be conveniently handled by a single machine. Furthermore, the mounting hub allows the transfer starwheel to be axially repositioned so that the recesses are sufficiently aligned with the center of gravity of the container when new container geometries are introduced. Furthermore, multiple starwheels may be incorporated and positioned such that the recesses straddle the center of gravity of the container for increased effectiveness.

Systems and methods according to aspects of the present invention also employ the combination of: (1) a vacuum transfer starwheel with recesses defined by compliant inserts that are configured to accommodate varying container shapes in the recesses; and (2) a mounting hub with more than one set of vacuum openings positioned along the mounting hub to allow the axial position of the vacuum transfer starwheel to be adjusted.

FIG. 1 illustrates a machine line 10 which is adapted to perform necking, flanging, and/or other processing on containers 2 as the containers 2 pass through a series of processing turrets 130 in a serpentine path. As used herein, "container" broadly refers to any article that is at any stage of manufacture to produce a finished container, including embryonic containers. Examples of containers include, but are not limited to, metal (e.g., aluminum, steel, etc.) cans or bottles. The containers 2 enter the machine line 10 via a can infeed 110 and then, after passing through an infeed vacuum starwheel 115, are then "picked up" by a first transfer starwheel 120a. The containers 2, which are held in position on the first transfer starwheel 120a by a vacuum (a pneumatic pressure differential), orbit about the rotational axis of the first transfer starwheel 120a so that the containers 2 are moved about at least a portion of the first transfer starwheel 120a. In the embodiment depicted in FIG. 1, the containers 2 are passed from the first transfer starwheel unit 120a to a first processing turret 130a and enter a processing step. The containers 2 then travel from the first processing turret 130a to a second transfer starwheel 120b, from the second transfer starwheel 120b to a second processing turret 130b, from the second processing turret 130b to a third transfer starwheel 120c, from the third transfer starwheel 120c to a third processing turret 130c, and so on for as many transfer starwheel and/or processing turrets that are in the machine line 10, and then onto the exit 140.

Figure 2:
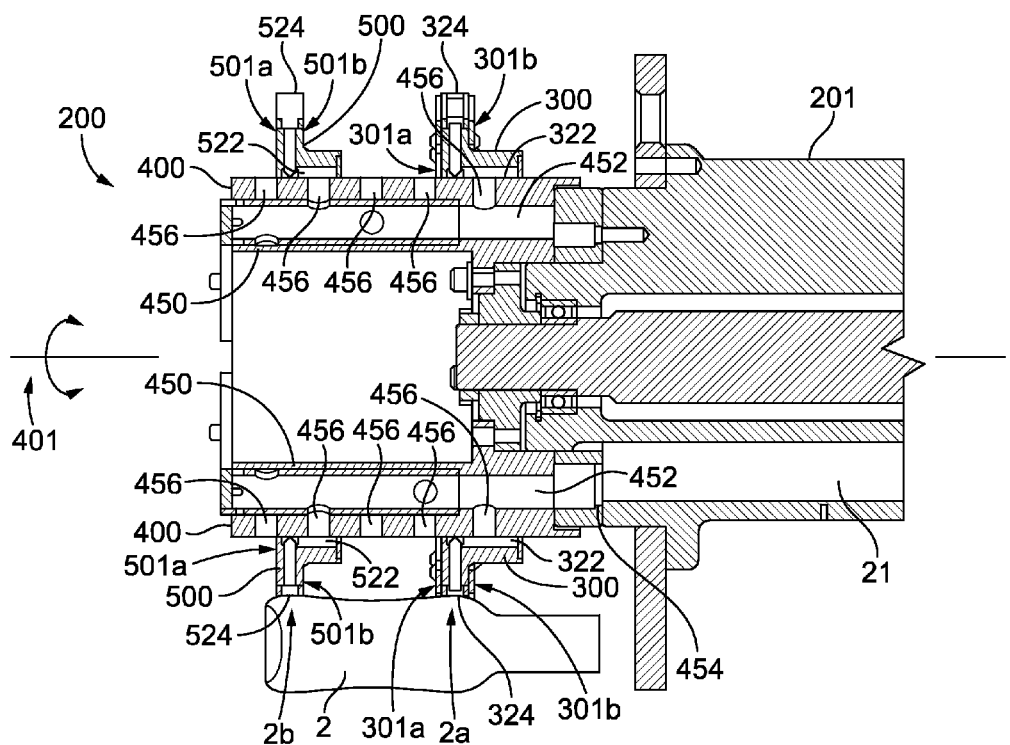
FIG. 2 illustrates a cross-sectional view of an example transfer assembly on a container processing machine, according to aspects of the present invention.

FIG. 2 illustrates a cross-sectional view of an example transfer assembly 200. The transfer assembly 200 is housed in a transfer housing 201 that is mounted on a container processing machine, for instance, in a machine line similar to the machine line 10 shown in FIG. 1. As shown in FIG. 2, the transfer assembly 200 includes a compliant starwheel assembly 300 and a rigid starwheel assembly 500 that releasably hold (i.e., hold and release on command) one or more containers 2 by applying a vacuum at ports 324 and 524, respectively.

Figure 3A:
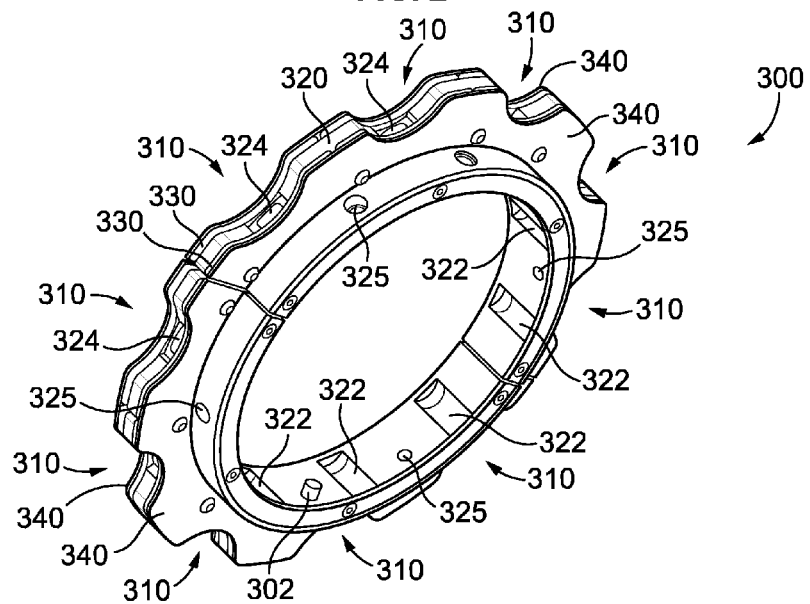
FIG. 3A illustrates an assembled view of an example compliant starwheel assembly, according to aspects of the present invention.

The starwheels 300 and 500 include recesses into which the containers 2 are received. FIGS. 3A and B show, for example, that the compliant starwheel assembly 300 includes a plurality of recesses 310. The number of recesses may be varied according to the type of container processing machine and the processing capacity/throughput required by the operation of the container processing machine. In addition, the geometric characteristics of the recesses may be modified to optimize holding force on the containers 2.

The vacuum ports 324 and 524 are disposed in the recesses of their respective starwheels 300 and 500. When a container 2 is received into a recess and placed in close proximity to the corresponding vacuum port, a vacuum is applied to the container 2 through the port. The vacuum holds the container 2 securely in the recess, permitting the starwheel assembly to rotate the container 2 to transfer the container 2 between processing turrets. While the rigid starwheel assembly 500 may operate in a manner similar to conventional transfer starwheels, the compliant starwheel assembly 300, as described in further detail below, employs compliant inserts in its recesses so that the transfer assembly 200 can accommodate varying container shapes more effectively.

As FIG. 2 shows further, the transfer assembly 200 includes a mounting hub assembly 400 that provides a rotating body onto which the starwheel assemblies 300 and 500 are mounted. The starwheel assemblies 300 and 500 are secured to the mounting hub assembly 400 such that one rotation of the mounting hub assembly 400 about a longitudinal axis 401 causes a corresponding rotation of the starwheel assemblies 300 and 500. The starwheel assemblies 300 and 500 are releasably secured at two different axial positions along the mounting hub assembly 400. In some embodiments, the starwheel assemblies 300 and 500 may be assembled onto the mounting hub assembly 400 as two or more separate sections to facilitate assembly and axial repositioning of the assemblies 300 and 500 along the mounting hub assembly 400, e.g., to accommodate different containers 2 as described further below.

The axial distance between the starwheel assemblies 300 and 500 depends on the distance between the sections of the container 2 that the starwheel assemblies 300 and 500 are required to engage, e.g., the shoulder 2a and the lowermost portion 2b. In general, a longer container 2 requires greater distance between the starwheel assemblies 300 and 500.

As additionally shown in FIG. 2, the mounting hub assembly 400 includes a vacuum assembly 450 which delivers the vacuum to the ports 324 and 524. Passageways 21 in the container processing machine delivers vacuum from a vacuum source, e.g., vacuum blowers (not shown), to the transfer housing 201. The vacuum is transferred to the mounting hub assembly 400 via a "non-contact" face seal vacuum valve 454. The valve 454 delivers vacuum only to the arc path traveled by the containers 2 while being held and transferred by the starwheel assemblies 300 and 500 (e.g., from approximately the 3:00 position to approximately the 9:00 position). Vacuum timing is important to maintaining proper transfer of the containers 2.

The vacuum assembly 450 includes vacuum passageways 452 that extend from the vacuum valve 454 to vacuum openings 456. The number of vacuum passageways 452 in the mounting hub assembly 452 is equal to the number of ports 324 or 524 that must receive vacuum pressure in each starwheel 300 or 500. For example, as shown in FIGS. 3A and B, the compliant starwheel assembly 300 includes ten recesses 310, each with a vacuum port 324, so the corresponding mounting hub assembly 400 includes ten vacuum passageways 452. The vacuum openings 456 align with vacuum passageways 322 and 522 in the starwheel assemblies 300 and 500, respectively. The vacuum passageways 322 and 522, in turn, lead to the respective ports 324 and 524. Accordingly, the vacuum assembly 450 delivers vacuum from a vacuum source to the starwheel assemblies 300 and 500 to generate a vacuum at the ports 324 and 524 to hold the containers 2.

Although FIG. 2 illustrates two starwheel assemblies 300 and 500 mounted on the mounting hub assembly 400, it is contemplated that any number of, i.e., one or more, starwheel assemblies may be employed to support containers on the transfer assembly 200. Moreover, it is also contemplated that the rigid starwheel assembly 500 shown in FIG. 2 may be replaced with another compliant starwheel assembly 300.

As shown in FIG. 2, the container 2 is a shaped container, i.e., a container whose sidewall at its middle section does not have a substantially uniform diameter (non-cylindrical). In order to facilitate air conveyance of shaped containers, the containers typically have a common diameter at the lowermost portion of the can and the uppermost portion of the can, sometimes referred to as the "shoulder" of the can. As shown in FIG. 2, the container 2 has a shoulder with a contoured profile, but may have any profile depending on the container design/specifications. The vacuum port 324 of the compliant starwheel assembly 300 engages the shoulder 2a of the container 2, while the port 524 of the rigid starwheel assembly 500 engages the lowermost portion 2b of the container 2. While the rigid starwheel assembly 500 may operate in a manner similar to conventional transfer starwheels, the compliant starwheel assembly 300 is configured to comply with the contoured profile of the shoulder 2a so that the shoulder 2a fits more precisely in the recess 310 to minimize vacuum loss from the vacuum port 324. In this way, the compliant starwheel assembly 300 maintains required control of the position of the container 2 during transfer. In general, the compliant starwheel assembly 300 allows the transfer assembly 200 to accommodate shaped containers more effectively than conventional transfer starwheel systems. Of course, it is contemplated that the transfer assembly 200 may be employed to handle both substantially cylindrical containers and shaped containers.

FIGS. 3A and B illustrate the compliant starwheel assembly 300 in greater detail. The compliant starwheel assembly 300 includes a starwheel body 320, compliant inserts 330, and retainer plates 340.

The starwheel body 320 includes the plurality of recesses 310, which receive the containers 2. In general, the shape and size of the starwheel body 320 may be varied according to the number of recesses 310 as well as the shape and size of the containers 2 being handled. For example, the width may vary for specific shape or size of containers. Moreover, the starwheel body 320 be formed as one piece or be assembled from multiple sections. The starwheel body 320 may be formed from steel, aluminum, or other substantially hard material suitable for the handling of the containers 2 in the transfer assembly 200.

The starwheel body 320 also includes the vacuum passageways 322 and the vacuum ports 324. As described previously, the vacuum passageways 322 couple the vacuum ports 324 to a vacuum source provided by the mounting hub 400, so that a vacuum can be generated in the recesses 310 to hold the containers 2.

As shown in FIGS. 3A and B, the compliant starwheel assembly 300 includes a plurality of compliant inserts 330 disposed on opposite sides of the starwheel body 320, where each opposing pair of compliant inserts 330 corresponds to one of the recesses 310 in the starwheel body 320. In alternative embodiments, an opposing pair of compliant inserts 330 may correspond to more than one recess 310. The compliant inserts 330 may be formed from rubber, polyurethane, or other suitably compliant materials depending on the application. In general, the insert material, hardness (durometer), thickness, and recess size may be varied to handle the shape and size of the container 2 most optimally. The compliant inserts 330 are configured so that they can conform to the section of the container 2, e.g., the shoulder 2a, that the compliant starwheel assembly 300 engages. When engaging the container 2, the compliant inserts 330 can sufficiently change shape to allow the compliant starwheel assembly 300 to handle containers with a variety of shapes. In addition, the compliancy of the inserts 330 accommodates process variations in the profile of the container 2 as well as pick-up location from the adjacent processing turret. Generally, the compliant inserts 330 are shaped, sized, and positioned to fit the shape, e.g., contoured profile, of the containers 2 received in the recesses 310. Moreover, the compliant inserts 330 are configured to extend from the vacuum ports 324 to deliver a vacuum to the containers 2 with minimal leakage. Moreover, compliant inserts 330 on the same starwheel may be different from each other to accommodate the shape of the container 2.

During operation, the containers 2 preferably come into contact with the compliant inserts 330 only. Sufficient clearances may be provided to avoid container contact with other parts of the compliant starwheel assembly 300.

Even when the transfer assembly 200 must handle new containers 2 with gross profile changes, the starwheels 300 and 500 do not have to be replaced if the generic diameter of the containers 2 remains the same. At most, new inserts 330 may be required to accommodate the change in profile. Indeed, the set of compliant inserts 330 may be selected from a plurality of compliant inserts 330 that accommodate containers 2 with varying shapes and sizes.

Figure 3B:
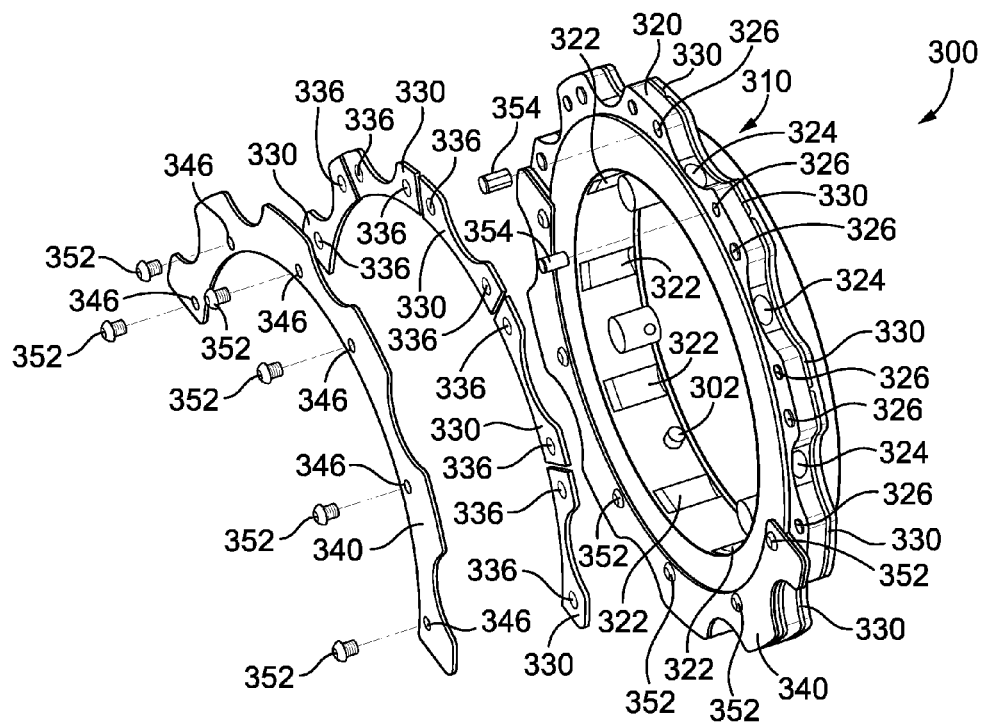
FIG. 3B illustrates an exploded view of the example compliant starwheel assembly of FIG. 3A.

The retainer plates 340 are employed to keep the compliant inserts 330 in their respective positions. As shown in FIGS. 3A and B, the compliant inserts 330 are disposed between the retainer plates 340 and the starwheel body 320. Although FIG. 3B illustrates two semi-circular retainer plates 340, other embodiments may employ any number of retainer plate (s) 340 to couple the compliant inserts 330 to the starwheel body 320. The retainer plates may be formed from steel, aluminum, or other comparable material.

As FIG. 3B illustrates, apertures 346 in the retainer plates 340 are aligned with corresponding bores (not shown) in the starwheel body. Fasteners 352 (e.g., screws) pass through the apertures 346 and into the bores to keep couple the retainer plates 340 to the starwheel body 320 with the compliant inserts 330 being disposed therebetween. To ensure that the compliant inserts 330 maintain their proper position relative to the starwheel body 320, guide pins 354 are mounted in the starwheel body 320 through apertures 326 of the compliant inserts 330 that are positioned over the guide pins 354. The retainer plates 340 operate to keep the compliant inserts 330 in position without clamping the compliant inserts 330 against the starwheel body 320. Clamping may cause the compliant inserts 330 to move (creep) over time, potentially compromising the accuracy and proper operation of the starwheel assembly 300.

Figure 4:
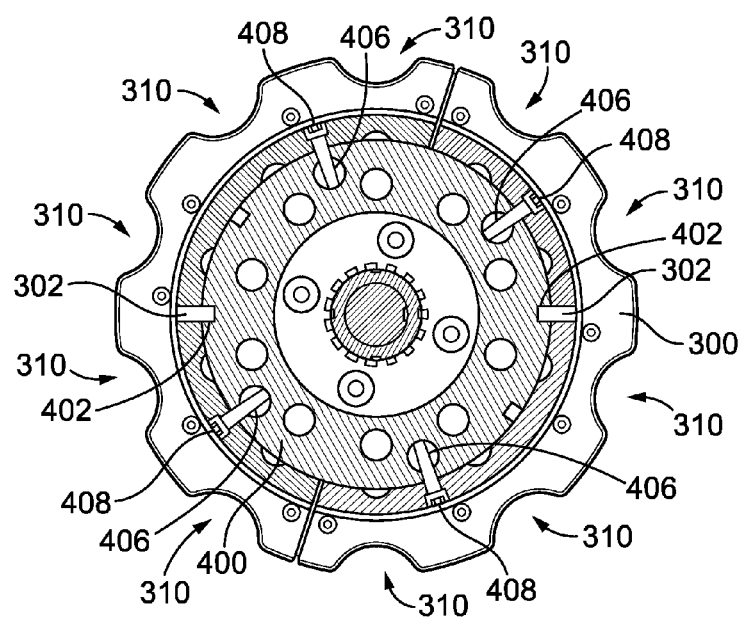
FIG. 4 illustrates a cross-sectional view of an example compliant starwheel assembly mounted to an example mounting hub assembly, according to aspects of the present invention.
Figure 5:
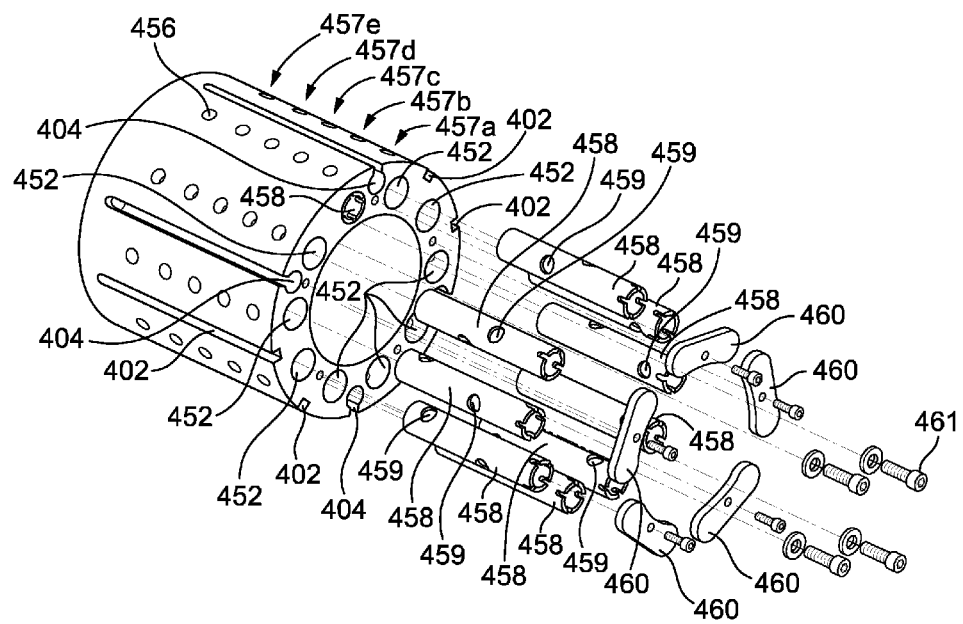
FIG. 5 illustrates an exploded view of an example mounting hub assembly, according to aspects of the present invention.

FIGS. 4 and 5 illustrate an example approach for mounting the compliant starwheel assembly 300 to the mounting hub assembly 400. The mounting hub assembly 400 includes alignment slots 402, and the starwheel assembly 300 includes alignment dowels (pins) 302 which are received by the alignment slots 402. This doweled and keyed alignment maintains proper alignment between the compliant starwheel assembly 300 and the mounting hub assembly 400. When the compliant starwheel assembly 300 is properly aligned with the mounting hub assembly 400, the vacuum passageways 322 of the starwheel body 320 are aligned with the vacuum openings 456 of the mounting hub assembly 400. The face of the mounting hub assembly 400 also includes starwheel mounting holes 404 that provide access for cylindrical starwheel mounting nuts 406. The starwheel mounting nuts 406 can then be moved to the desired axial position for the compliant starwheel assembly 300 along the mounting hub assembly 400. Corresponding mounting fasteners 408 (e.g., screws) extend through apertures 325 (see FIG. 3A) in the starwheel body 320 and are received by the mounting nuts 406 to secure the compliant starwheel assembly 300 to the mounting hub assembly 400.

As described above, the mounting hub assembly 400 includes a vacuum assembly 450 which generates the vacuum in the recesses of the starwheel assemblies 300 and 500 via vacuum passageways 452 and vacuum openings 456. FIG. 5 illustrates a plurality of circumferential sets 457a-e of vacuum openings 456 arranged axially along the outer perimeter of the mounting hub assembly 400. This arrangement of vacuum openings 456 allows the starwheel assemblies 300 and 500 to be adjustably positioned along the mounting hub assembly 400 to accommodate containers of varying lengths. The wide range in adjustability facilitates reconfiguration of the transfer assembly 200 when the container processing machine must be changed over to handle differently shaped/sized containers 2. In particular, one of the starwheel assemblies 500 or 300 is positioned in alignment with one of the circumferential sets of vacuum openings 456, while the other is positioned in alignment with one of the other circumferential sets of vacuum openings 456. As described above, the positions of the starwheels 300 and 500 depend on the size and shape of the containers 2 being handled by the transfer assembly 200.

Figure 6:
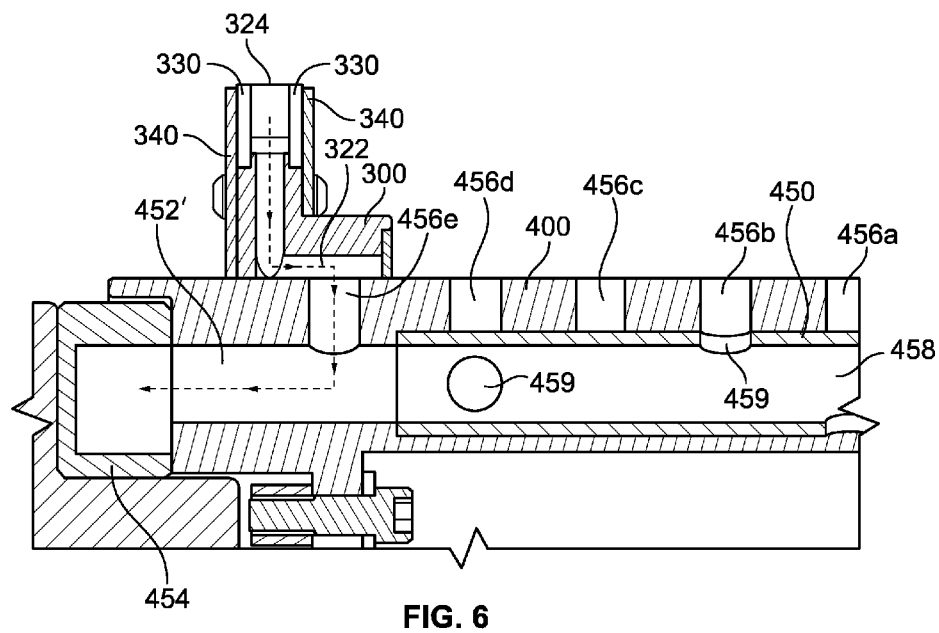
FIG. 6 illustrates another cross-sectional view of an example compliant starwheel assembly mounted to an example mounting hub assembly, according to aspects of the present invention.

Each vacuum passageway 452 extends axially along the mounting hub assembly 400 to deliver vacuum pressure to a series of vacuum openings 456 that are correspondingly aligned axially along the mounting hub assembly 400. For example, FIG. 6 shows a vacuum passageway 452' that leads to at least vacuum openings 456a-e that are axially aligned along the mounting hub assembly 400. FIG. 6 also shows that one of the vacuum passageways 322 of the compliant starwheel assembly 300 is aligned with the vacuum hole 456e. Meanwhile, the rigid starwheel assembly 500 (not shown) will be aligned with the vacuum openings 456b. Because the starwheel assemblies 300 and 500 only require two of the axially aligned holes 456a-e, the vacuum assembly 450 provides a vacuum selector tube 458 that can be placed in the vacuum passageway 452' to close vacuum openings 456a, c, and d, while leaving vacuum openings 456b and open for the starwheel assemblies 300 and 500. As such, vacuum pressure is not lost through the unused vacuum openings.

FIG. 5 shows that a selector tube 458 is provided in each of the vacuum passageways 452. The selector tubes 458 are kept in place and covered by retainers 460, which are secured to the mounting hub assembly 400 with fasteners 461 (e.g., screws). In general, the selector tube 458 includes holes 459 that are properly indexed to supply vacuum to the required set of vacuum openings 456. In other words, the vacuum selection tubes 458 are indexed to select the appropriate vacuum openings 456 to match the positions of the starwheel assemblies 300 and 500. Although embodiments described above may employ selector tubes 458 to configure the vacuum passages, it is understood that plastic plugs, pipe plugs, rubber bands/sleeves, or other techniques for blocking selected vacuum openings 456 may be employed in alternative embodiments. Advantageously, however, employing the selector tubes 458 may minimize the time required to change the positions of the starwheel assemblies 300 and 500 on the mounting hub assembly 400 and may be less prone to damage.

FIG. 2 shows that the rigid starwheel assembly 500 has opposing sides 501A and 501B, while the compliant starwheel assembly 300 has opposing sides 301A and 301B. The starwheel assemblies 300 and 500 are mounted on the mounting hub 400, so that, as illustrated in FIG. 2, the sides 501A and 301A face to the left and conversely the sides 501B and 301B face to the right. In other embodiments, the rigid starwheel assembly 500 and/or the compliant starwheel assembly 300 may be mounted in the opposite orientation. As illustrated, the sides 501A and/or 301A would face to the right and the sides 501B and/or 301B would correspondingly face to the left. By allowing the starwheel assemblies 300 and 500 to be mounted in both orientations, the transfer assembly 200 provides more axial positions for the vacuum ports 524 and 334 and their corresponding recesses (i.e., positioned to the left or to the right of the vacuum openings 456, as shown in FIG. 2). As such, the transfer assembly 200 provides additional distances between the vacuum ports 524 and 334 and their corresponding recesses and can accommodate more container lengths.

Each of these embodiments and obvious variations thereof is contemplated as falling within the spirit and scope of the claimed invention, which is set forth in the following claims. For example, although the embodiments described herein may transport containers, such as cans or bottles, it is understood that aspects of the present invention may be employed to handle any articles during manufacturing. Moreover, the present concepts expressly include any and all combinations and subcombinations of the preceding elements and aspects, regardless of the embodiments referenced in the description of the elements and aspects.

What is claimed is:

1. A system for transporting articles, comprising:
   a transfer starwheel assembly including one or more recesses, each recess being configured to receive an article, and each recess including a vacuum port and at least one insert formed from a compliant material, the at least one insert at least partially defining a shape of the recess, the shape of the recess corresponding to an aspect of the article; and
   a mounting hub assembly including a plurality of circumferential sets of vacuum openings, each circumferential set being spaced axially along the mounting hub assembly from an adjacent circumferential set, the circumferential sets of vacuum openings configured to be coupled to a vacuum source,
   wherein the transfer starwheel assembly is configured to be mounted on the mounting hub assembly, the transfer starwheel assembly being positioned on the mounting hub assembly to align the vacuum ports of the transfer starwheel assembly with a selected one of the sets of vacuum openings on the mounting hub assembly, the mounting hub assembly and the transfer starwheel assembly rotating so that the transfer starwheel assembly receives the article into one of the recesses at a first position and rotates with the mounting hub assembly to a second position, the article being held in the recess between the first position and the second position by the shape of the recess and the vacuum at the vacuum port in the recess.

2. The system of claim 1, wherein the a transfer starwheel assembly includes a starwheel body and at least one retainer plate, the starwheel body including the vacuum ports for the recesses, wherein the at least one inserts for the one or more recesses are coupled to the starwheel body with the at least one retainer plate, the at least one inserts being disposed between the starwheel body and the retainer plate.

3. The system of claim 2, wherein, for each recess, the at least one insert includes a first insert disposed on a first side of the starwheel body and a second insert disposed on a second side of the starwheel body, the first insert and the second insert extending from the vacuum port to apply the vacuum to the article when the article is received in the recess and directly engaged by the first insert and the second insert.

4. The system of claim 2, further comprising guide pins that position the at least one insert relative to the starwheel body.

5. The system of claim 1, wherein the mounting hub assembly includes a vacuum assembly that delivers vacuum from the vacuum source to the selected set of vacuum openings and the vacuum ports of the transfer starwheel assembly, the vacuum assembly including a plurality of passageways for delivering the vacuum and a selector tube disposed in each passageway to direct the vacuum to the selected set of vacuum openings and to close other sets of vacuum openings.

6. The system of claim 1, wherein the mounting hub assembly includes alignment slots and the transfer starwheel assembly includes pins that are received by the alignment slots to align the vacuum ports of the transfer starwheel assembly with the selected set of vacuum openings on the mounting hub assembly.

7. The system of claim 1, further comprising at least one other transfer starwheel assembly mounted on the mounting hub assembly, the at least one other transfer starwheel being aligned with other selected sets of vacuum openings on the mounting hub assembly.

8. The system of claim 1, wherein at least one of the transfer starwheel assembly and the other transfer starwheel assembly is configured to be mounted in two facing directions.

9. The system of claim 1, wherein the at least one insert for each recess is at least one of shaped and sized, and positioned to fit a contoured profile of the article received into the recess.

10. The system of claim 1, wherein the at least one insert is formed from rubber, polyurethane, or other compliant material.

11. The system of claim 1, further comprising a plurality of inserts, the at least one inserts being selected from the plurality of inserts and included in the transfer starwheel assembly.

12. A transfer starwheel assembly for transporting articles, comprising:
one or more recesses, each recess being configured to receive an article, and each recess including a vacuum port and at least one insert formed from a compliant material, the at least one insert at least partially defining a shape of the recess, the shape of the recess corresponding to an aspect of the article,
wherein the transfer starwheel assembly is configured to be mounted on a mounting hub assembly, the mounting hub assembly including a plurality of circumferential sets of vacuum openings, each circumferential set being spaced axially along the mounting hub assembly from an adjacent circumferential set, the circumferential sets of vacuum openings configured to be coupled to a vacuum source, the transfer starwheel assembly being positioned on the mounting hub assembly to align the vacuum ports of the transfer starwheel assembly with one of the sets of vacuum openings on the mounting hub assembly, the transfer starwheel assembly rotating with the mounting hub assembly so that the transfer starwheel assembly receives the article into one of the recesses at a first position and rotates with the mounting hub assembly to a second position, the article being held in the recess between the first position and the second position by the shape of the recess and the vacuum at the vacuum port in the recess.

13. The assembly of claim 12, wherein the transfer starwheel assembly includes a starwheel body and at least one retainer plate, the starwheel body including the vacuum ports for the recesses, wherein the at least one insert for the one or more recesses are coupled to the starwheel body with the at least one retainer plate, the at least one insert being disposed between the starwheel body and the retainer plate.

14. The assembly of claim 13, wherein, for each recess, the at least one insert includes a first insert disposed on a first side of the starwheel body and a second insert disposed on a second side of the starwheel body, the first insert and the second insert extending from the vacuum port to apply the vacuum to the article when the article is received in the recess and directly engaged by the first insert and the second insert.

15. The assembly of claim 14, wherein the transfer starwheel assembly includes pins, the pins being configured to be received by alignment slots in the mounting hub assembly to align the vacuum ports of the transfer starwheel assembly with the selected set of vacuum openings on the mounting hub assembly.

16. The assembly of claim 12, wherein the at least one insert for each recess is shaped and positioned to fit a contoured profile of the article received into the recess.

17. The assembly of claim 12, wherein the at least one insert is formed from rubber, polyurethane, or other compliant material.

18. A mounting hub assembly for receiving a transfer starwheel assembly, the mounting hub assembly comprising:
a rotating body including a plurality of circumferential sets of vacuum openings, each circumferential set being spaced axially along the mounting hub assembly from an adjacent circumferential set, the circumferential sets of vacuum openings configured to be coupled to a vacuum source,
wherein the rotating body is configured to receive a transfer starwheel assembly, the transfer starwheel assembly being positioned on the mounting hub assembly to align vacuum ports of the transfer starwheel assembly with one of the sets of vacuum openings on the mounting hub assembly, the mounting hub assembly rotating so that the transfer starwheel assembly receives an article at a first position and rotates with the mounting hub assembly to a second position, the article being held in the recess between the first position and the second position by the shape of the recess and the vacuum at the vacuum port in the recess.

19. The assembly of claim 18, wherein the mounting hub assembly includes a vacuum assembly that delivers vacuum from the vacuum source to the selected set of vacuum openings, the vacuum assembly including a plurality of passageways for delivering the vacuum and a selector tube disposed in each passageway to direct the vacuum to the selected set of vacuum openings and to close other sets of vacuum openings.

20. The assembly of claim 19, wherein the mounting hub assembly includes alignment slots configured to receive pins from the transfer starwheel assembly to align the vacuum ports of the transfer starwheel assembly with the selected set of vacuum openings on the mounting hub assembly.

* * * * *